(12) United States Patent
Markert

(10) Patent No.: US 10,040,324 B2
(45) Date of Patent: Aug. 7, 2018

(54) TIRE-MONITORING SYSTEM AND METHOD THEREFOR

(71) Applicant: ALLIGATOR VENTILFABRIK GMBH, Giengen (DE)

(72) Inventor: Christian Markert, Herbrechtingen (DE)

(73) Assignee: ALLIGATOR VENTILFABRIK GMBH, Giengen (DE)

( * ) Notice: Subject to any disclaimer, the term of this patent is extended or adjusted under 35 U.S.C. 154(b) by 0 days.

(21) Appl. No.: 15/322,709

(22) PCT Filed: Jul. 23, 2015

(86) PCT No.: PCT/EP2015/066921
§ 371 (c)(1),
(2) Date: Jun. 23, 2017

(87) PCT Pub. No.: WO2016/016099
PCT Pub. Date: Feb. 4, 2016

(65) Prior Publication Data
US 2018/0022169 A1   Jan. 25, 2018

(30) Foreign Application Priority Data

Jul. 28, 2014   (DE) .......................... 10 2014 214 769

(51) Int. Cl.
*B60C 23/00*      (2006.01)
*B60C 23/02*      (2006.01)
(Continued)

(52) U.S. Cl.
CPC ........ *B60C 23/009* (2013.01); *B60C 23/0479* (2013.01); *B60C 23/0483* (2013.01); *G07C 5/008* (2013.01)

(58) Field of Classification Search
CPC .............. B60C 23/009; B60C 23/0479; B60C 23/0483
(Continued)

(56) References Cited

U.S. PATENT DOCUMENTS 6,972,671 B2   12/2005   Normann et al.
7,839,270 B2   11/2010   Shimura
(Continued)

FOREIGN PATENT DOCUMENTS

DE        100 14 949      10/2001
DE   10 2006 026 527      12/2006
(Continued)

OTHER PUBLICATIONS

International Search Report and Written Opinion dated Sep. 15, 2015 in PCT/EP2015/066921.

*Primary Examiner* — John A Twell, Jr.
(74) *Attorney, Agent, or Firm* — Faegre Baker Daniels LLP

(57) ABSTRACT

The invention relates to a tire-monitoring system for monitoring a tire air pressure and/or at least one other tire-specific quantity in tires of a vehicle; —comprising a plurality of tire sensors for positioning in the tires of the vehicle; —each tire sensor having at least one sensing device for sensing a tire-specific quantity and a control device that has at least one transmitter for transmitting signals in dependence on the sensed quantity and/or a quantity previously programmed in the control device; —and comprising a router for installing in the vehicle, which router comprises a receiver for receiving the signals of the plurality of tires sensors, a memory for storing the quantities of the tire sensors transmitted by means of the signals, and an interface for the wired or wireless retrieval of the stored quantities; —the router having an electrical power connection, by means of which the router can be connected to a vehicle electrical system for the supply of power to the router. The tire-monitoring system according to the invention is characterized in that the router has an energy store, which provides an electrical power supply when the vehicle electrical system is switched off and which can be charged by means of the electrical power connection.

21 Claims, 1 Drawing Sheet

(51) Int. Cl.
*G07C 5/00* (2006.01)
*B60C 23/04* (2006.01)

(58) Field of Classification Search
USPC .......................................................... 340/442
See application file for complete search history.

(56) References Cited

U.S. PATENT DOCUMENTS

| | | | |
|---|---|---|---|
| 7,880,595 B2 | 2/2011 | Shimura | |
| 8,558,690 B2* | 10/2013 | Kleve | B60C 23/0479 340/425.5 |
| 9,050,862 B2* | 6/2015 | Mouchet | B60C 23/0479 |
| 2006/0279416 A1 | 12/2006 | Watabe | |
| 2007/0069877 A1* | 3/2007 | Fogelstrom | B60C 23/009 340/442 |
| 2007/0210905 A1 | 9/2007 | Battista | |
| 2011/0043343 A1* | 2/2011 | Shepler | B60C 23/0483 340/431 |
| 2017/0217261 A1* | 8/2017 | Mays | B60C 23/0479 |

FOREIGN PATENT DOCUMENTS

| | | |
|---|---|---|
| EP | 1 172 237 | 1/2002 |
| EP | 1 769 948 | 4/2007 |
| EP | 2 159 122 | 3/2010 |
| EP | 2 287 020 | 2/2011 |

\* cited by examiner

TIRE-MONITORING SYSTEM AND METHOD THEREFOR

The present invention relates to a method for monitoring a tire air pressure and/or at least one other tire-specific variable in tires of a vehicle, in particular of a trailer or semitrailer of a truck, and a tire monitoring system for monitoring the tire air pressure and/or the other variable.

Tire monitoring systems as they relate to the present invention are known in a variety of embodiments. In contrast to passive tire monitoring systems, tire monitoring systems of the type in question, which are also used in particular for monitoring a tire air pressure, have a plurality of tire sensors, which are positioned in the tires of the vehicle for detecting the tire air pressure prevailing therein or for detecting another tire-specific variable, for example, the temperature. In this case, these tire sensors have a battery to supply the electronics provided in the tire sensors with electrical power. Various measures are known for minimizing the power consumption, for example, by switching the tire sensors into a type of sleep state or standby mode when they are in an idle state. This is because it is only possible to replace the batteries with a high level of effort as a result of the positioning inside the pneumatic tire of the vehicle. In addition, in some tire sensors the battery is embedded in the interior thereof, so that a replacement is not possible at all.

The tire sensors in the pneumatic tires have transmitters, which emit signals, via which the variable detected thereby or the variables detected thereby are communicated to a receiver in the vehicle. The problems of the electrical power supply generally do not result in the case of the receiver in the vehicle, because it is conventionally simply connected to the onboard electrical system of the motor vehicle. When the motor vehicle is started, i.e., when the onboard electrical system is turned on, the receiver in the vehicle can query the various tire sensors and display the measured values or, if needed, a warning to the vehicle driver. The systems operate reliably and conveniently in practice in this regard.

One disadvantage in the known systems, however, is that they do not take into consideration special requirements of freight haulers or logistics companies, whose business model is based on keeping ready a variety of trailers or semitrailers, which are transported using changing tractors of changing responsible vehicle drivers. A visual check is thus generally carried out when retrieving the trailers or semitrailers and a critical state in a pneumatic tire of the trailer or semitrailer can be communicated to the vehicle driver via the driver information system of the tractor after coupling to the tractor. However, the freight hauler or a central office or central service station of the logistics company does not have a present central access to all existing trailers or semitrailers when they are not coupled to a tractor.

EP 2 287 020 A1 describes the possibility of carrying out a remote query of the tire air pressure status and a tire identification by means of a mobile computer and providing it for fleet management or a maintenance center. The fleet manager accordingly receives individual tire characteristic values together with the status of the tire air pressure and can assign measures to a mechanic if necessary.

The present invention is based on the object of improving a tire monitoring system and a corresponding method of the type mentioned at the outset such that central and/or automatic monitoring of tire states of trailers or semitrailers is possible at nearly any time, also in the state not coupled to tractors.

The object according to the invention is achieved by a method having the features of claim 1 and a tire monitoring system having the features of claim 8. Advantageous embodiments of the invention are specified in the dependent claims.

A method according to the invention for monitoring a tire air pressure and/or at least one other tire-specific (state) variable in tires of a vehicle, in particular in tires of a trailer or semitrailer of a truck, comprises the following steps:
detecting the tire air pressure and/or the at least one other tire-specific variable using a detection unit of a tire sensor in a tire and transmitting signals as a function of the detected variable by means of a transmitter of a control device of the tire sensor to a router in the vehicle;
receiving the signals transmitted by means of the transmitter by means of a receiver of the router and storing the variables transmitted with the signals in a memory of the router; wherein
the router is supplied with electrical power for receiving the signals and storing the variables during driving operation of the vehicle via an electrical power terminal from an onboard electrical system of the vehicle; wherein
the router is supplied with electrical power from an energy storage of the router outside the driving operation of the vehicle when the onboard electrical system is turned off, wherein the energy storage is chargeable via the electrical power terminal when the onboard electrical system is turned on, and
at least also when the onboard electrical system is turned off and the router is supplied with electrical power using its energy storage, a mobile communication device is at least indirectly coupled to an interface of the router for wired or wireless query of the variables stored in the memory, which communication device is connected via an Internet access to a database having router-specific data and initiates a bidirectional data connection with bidirectional data exchange between the database and the router either via a direct wireless connection between the router and the database or via an indirect connection via the mobile communication device.

Variables stored in the memory, in particular the tire air pressure of the various tires and/or at least one limiting value for the tire air pressure and/or for the at least one other tire-specific variable are particularly advantageously transmitted to the database via the bidirectional data connection between the router and the database and, if at least one updated limiting value and/or updated software for the router and/or the control device of the tire sensor is present in the database, the updated limiting value and/or the updated software is transmitted from the database to the router.

It is advantageous if an identification code of the vehicle, in particular the official registration mark of the vehicle, is input or detected using the mobile communication device and transmitted to the database to initiate the bidirectional data exchange.

One particularly advantageous embodiment of the invention provides that after transmitting the identification code of the vehicle to the database, this database establishes the bidirectional data connection with the router or transmits access data, in particular comprising a serial number, of the router to the mobile communication device, using which subsequently a bidirectional data connection is established between the mobile communication device and the router.

It is advantageously provided that the tire air pressure and/or the at least one other tire-specific variable is also detected using the detection unit of the tire sensor, transmitted by means of the transmitter to the router, and stored in the memory of the router at regular or irregular predefined intervals when the onboard electrical system is turned off.

According to one particularly advantageous embodiment of the method according to the invention, it is provided that after establishing the bidirectional data connection between the router and the database or during or after the coupling of the mobile communication device to the interface of the router, the tire air pressure and/or the at least one other tire-specific variable is detected using the detection unit of the tire sensor, transmitted by means of the transmitter to the router, and stored in the memory of the router.

For example, in one embodiment of the invention, data and/or logs of a visual check of the vehicle and/or the tires can be input into the mobile communication device or detected thereby and transmitted to the database.

A tire monitoring system according to the invention for monitoring a tire air pressure and/or at least one other tire-specific variable in tires of a vehicle has a plurality of tire sensors for positioning in the tires of the vehicle, wherein each tire sensor has at least one detection unit for detecting a tire-specific variable, in particular a tire air pressure, and a control device having at least one transmitter for transmitting signals as a function of the detected variable and in particular additionally a variable previously programmed in the control device. In other words, according to one embodiment, it is not only possible, directly or indirectly using the tire sensor of the tire monitoring system, to detect a tire-specific variable in the tires of the vehicle and subsequently to transmit it via a signal generated by the associated transmitter, but rather signals can also be transmitted which describe or code one or more variables, for example, an identification number, maximum values or minimum values (limiting values), or the like, which were not detected, but rather were previously programmed into the control device.

According to the invention, at least one router is provided for installation in the vehicle, which has a receiver for receiving the signals of the plurality of tire sensors, a memory for storing variables of the tire sensors transmitted with the signals, and an interface for the wired or wireless query of the stored variables.

According to the invention, the router has an electrical power terminal, via which the router is connectable to an onboard electrical system of the vehicle for its power supply. In addition, the router also has, according to the invention, a so-called "internal" energy storage, which provides an electrical power supply of the router even when the onboard electrical system is turned off or when the router is disconnected from the onboard electrical system, wherein the energy storage is chargeable via the electrical power terminal by means of the onboard electrical system when a corresponding connection is established again or the onboard electrical system has been turned on again.

According to one embodiment of the invention, the energy storage is embodied as a supercapacitor (supercap) or has at least one such supercapacitor. For example, the supercapacitor can have a capacitance of greater than 1 F (faraday), in particular greater than 3 or 5 F, advantageously having a self-discharge time of greater than one week, in particular greater than two weeks. Instead of a supercapacitor, however, a rechargeable battery or a rechargeable battery pack also comes into consideration, for example, lithium-ion rechargeable batteries or also based on other technologies, for example, nickel-metal hydride. The capacitance is advantageously 1000, 1500, 2000, 2500 mAh or greater.

According to the embodiment according to the present invention, a mobile communication device is provided, which can be coupled in a wired or wireless manner to the router via the interface, in order to query the variables stored in the router. The mobile communication device can be embodied as a handheld device, for example, which accordingly connects itself via the interface to the router or the control device thereof, respectively, so that the previously detected and stored tire-specific variables or the presently detected and stored tire-specific variable can be queried. In principle, it is also possible to query a present variable without intermediate storage.

Coupling of the mobile communication device to the interface of the router is to be understood in the device according to the invention and the method as both direct, i.e., immediate coupling and also indirect coupling. In the case of indirect coupling, a further unit is connected into the communication connection between the interface of the router and the mobile communication device, for example, a communication translator which is connected on one side to the interface of the router in a wireless or wired manner in a communicating connection and has a wired or wireless communicating connection to the mobile communication device on the other side. For example, the router uses the same communication technology for communication with the communication translator as for communication with the tire pressure sensors, for example, ISM 434 MHz. The communication translator can then in particular convert the data exchanged with the tire pressure sensors into a communication technology, e.g., USB, Bluetooth, or WLAN, typical for mobile communication devices, such as smart phone, tablet, or laptop.

The mobile communication device has an Internet access, via which it can advantageously be coupled to a web-browser-assisted database having tire-specific data. It is thus possible that the communication device, for example, the handheld device, connects to an Internet site, for example, via an app, and obtains the serial number of the router therefrom, after an identification code has been input or detected, for example, the official registration mark of the vehicle, i.e., the characters and/or numbers on the license plate. This identification code can either be input into the mobile communication device by means of a keyboard, which can also be embodied as a virtual keyboard, or can be scanned by the mobile communication device. When the mobile communication device has received, for example, the serial number of the router from the database, and/or after input of the identification code, an application on the Internet site can contact the router or the control device thereof and can read out the memory of the router, to store the last received data in a central database. Of course, this storage can also take place in two steps, firstly by storing the data in the mobile communication device and subsequently transmitting the data into the central database. It is also possible by way of this connection to the central database to write new values, in particular limiting values, into the memory of the router, which are to apply to future driving operation.

According to one embodiment of the invention, the router also receives signals having tire-specific variables from the tire sensors in the tires of the vehicle in the shutdown state of the vehicle, at least at intervals. In this case, a query by the router or automatic transmission by the tire sensors can be provided. Because of its internal energy storage, the router can also store these received variables in the shutdown state of the vehicle, until the internal energy storage is completely discharged. However, because of the capacitance of the internal energy storage, such a complete discharge will only occur after weeks, and generally not at all, because a trailer or semitrailer equipped with the tire monitoring system according to the invention will be coupled to a tractor again and supplied with power, so that the onboard electrical system charges the internal energy storage of the router again.

According to one embodiment of the invention, a log of the visual check can be input using the mobile communication device, which is transmitted to the central database and/or stored in the router.

Therefore, convenient and continuous and also central monitoring of the tire-specific variables of a plurality of vehicles, in particular trailers or semitrailers, is possible using the tire monitoring system according to the invention, even if these vehicles are not in a state having an onboard electrical system which is presently turned on.

A trailer or semitrailer for a motor vehicle having a tire monitoring system according to the invention advantageously has a mechanical coupling for coupling to a tractor and an onboard electrical system. Furthermore, an electrical coupling for the onboard electrical system is provided, which can be coupled to an onboard electrical system of a tractor for the power supply of the onboard electrical system.

Furthermore, a plurality of pneumatic tires is provided, each having at least one corresponding tire sensor.

A tire monitoring system of the type mentioned at the outset is advantageously installed in the trailer or semitrailer, wherein the router is connected using its electrical power terminal to the onboard electrical system of the trailer.

According to one embodiment of the method according to the invention, the variables read out from the memory are transmitted to the database, after the mobile communication device connects itself, after input of a code identifying the vehicle, via its Internet access to the database having router-specific data. Data detected by the input device to be actuated by a user are advantageously also detected by the mobile communication device and transmitted to the database, for example, the above-mentioned log of the visual check.

The invention will be described by way of example hereafter on the basis of an exemplary embodiment in the figures.

Figure 1:
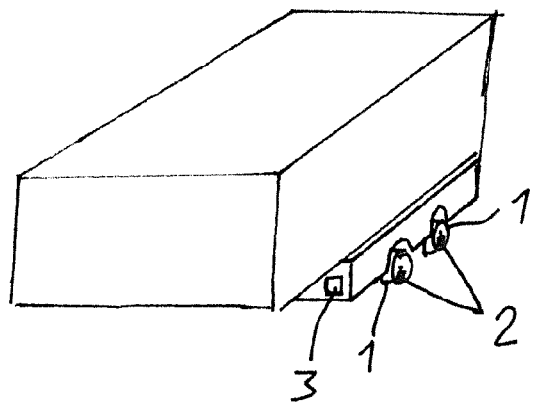
FIG. 1 shows a schematic illustration of a semitrailer having a tire monitoring system according to the invention.

FIG. 1 schematically shows a semitrailer, in each of the tires 1 of which a tire sensor 2 is positioned. Each tire sensor 2 detects, for example, the air pressure inside the tire 1 and optionally further variables, for example, the temperature, the rotational direction, and/or the acceleration.

Furthermore, a router 3 is provided outside the revolving tires 2 in the semitrailer, which works together with the tire sensors 2 in the tires 1 and receives signals from the tire sensors 2, which contain tire-specific variables detected by the tire sensors 2.

Figure 2:
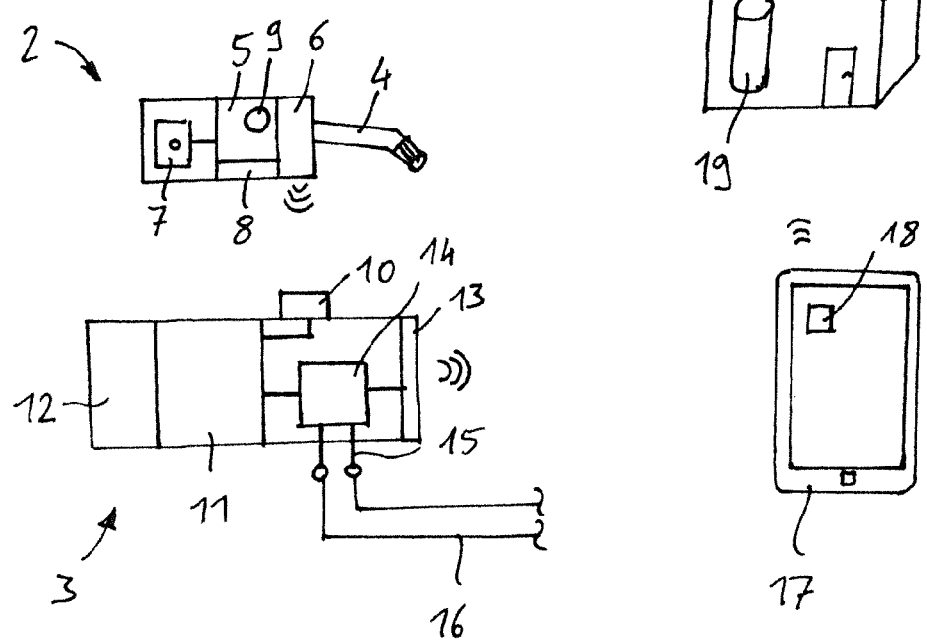
FIG. 2 shows a schematic illustration of various components of the tire monitoring system.

FIG. 2 shows, again very schematically, the construction of the tire sensors 2 and the router 3 by way of example. The tire sensors 2 are connected, for example, to the air valve 4 of the respective tire, wherein positioning in the respective tire independently of the air valve 4 is also possible, and have, in addition to a control device 5, a transmitter 6 for transmitting signals to the router 3. The tire sensors 2 furthermore have at least one detection unit 7, which detects, for example, the above-mentioned tire air pressure in the tire. A memory 8 can also be provided, which stores detected tire-specific variables or variables which are programmed in externally.

Finally, each tire sensor 2 has an energy storage 9, which is embodied in particular in the form of a battery and which is generally not rechargeable.

The signals of the tire sensors 2, which are transmitted by means of the transmitter 6 controlled by the control device 5, are received by the receiver 10 of the router 3, processed by the control device 11 of the router 3, and stored in the memory 12 of the router 3. Furthermore, the router 3 has an interface 13 for the wired or wireless, wireless here, query of the stored variables. The interface 13 can be embodied, for example, as a WLAN interface, infrared interface, or Bluetooth interface or also as a mobile wireless interface.

The router 3 has an energy storage 14, which also maintains the operation of the router 3 when the router 3 is not connected with its electrical power terminal 15 to the onboard electrical system 16 of the semitrailer or if the onboard electrical system 16 is turned off in a manner disconnected from the tractor when the semitrailer is shut down. The energy storage is rechargeable using electrical power from the onboard electrical system 16 via the electrical power terminal 15.

The router 3 can be addressed using a mobile communication device 17, for example, a tablet computer or a smart phone, to establish a connection between the mobile communication device 17 and the router 3 or its control device 11 via the interface 13. If a unidirectional or advantageously bidirectional connection is established between the router 3 and the mobile communication device 17, it is now possible to read out data from the memory 12 of the router 3, therefore tire-specific variables previously transmitted by the tire sensors 2. It is advantageously possible to also write data in the memory 12, in particular so that these data are subsequently transferred into the tire sensors 2.

The mobile communication device 17 now connects itself not only to the router 3, but rather also via an Internet access, for example, the app 18 illustrated here, to a central database 19. This central database 19, which can provide an Internet site, for example, can now connect itself via the mobile communication device 17 or also directly via the interface 13, if it is configured accordingly, to the control device 11 of the router 3, to read data out of the memory 12 or write data therein. In the interconnected mobile communication device 17, the data from the memory 12 can also first be transmitted to the mobile communication device 17 and subsequently to the database 19 and vice versa.

It is therefore possible to monitor and manage tire-specific variables from a plurality of semitrailers according to FIG. 1 or trailers or also vehicles of another type by means of the database 19, even if the router 3 is not connected to an active external power supply.

Furthermore, it is possible to carry out visual checks and to transmit corresponding data or logs by means of the mobile communication device 17 to the database 19.

The invention claimed is:

1. A method for monitoring a tire air pressure and/or at least one other tire-specific variable in tires of a vehicle, in particular of a trailer or semitrailer of a truck, having the following steps:

detecting the tire air pressure and/or the at least one other tire-specific variable using a detection unit of a tire sensor in a tire and transmitting signals as a function of the detected variable by means of a transmitter of a control device of the tire sensor to a router in the vehicle;

receiving the signals transmitted by means of the transmitter by means of a receiver of the router and storing the variables transmitted with the signals in a memory of the router; wherein the router is supplied with electrical power for receiving the signals and storing the variables during driving operation of the vehicle via an electrical power terminal from an onboard electrical system of the vehicle;

characterized in that the router is supplied with electrical power from an energy storage of the router outside the driving operation of the vehicle when the onboard electrical system is turned off, wherein the energy storage is chargeable via the electrical power terminal when the onboard electrical system is turned on, and at least also when the onboard electrical system is turned off and the router is supplied with electrical power using its energy storage, a mobile communication device is at least indirectly coupled to an interface of the router for the wired or wireless query of the variables stored in the memory, which communication device connects itself via an Internet access to a database having router-specific data and initiates a bidirectional data connection with bidirectional data exchange between the database and the router either via a direct wireless connection between the router and the database or via an indirect connection via the mobile communication device.

2. The method according to claim 1, characterized in that, via the bidirectional data connection between the router and the database, variables stored in the memory, in particular the tire air pressure of the various tires and/or at least one limiting value for the tire air pressure and/or for the at least one other tire-specific variable are transmitted to the database and if at least one updated limiting value and/or updated software for the router and/or the control device of the tire sensor is present in the database, the updated limiting value and/or the updated software are transmitted from the database to the router.

3. The method according to claim 1, characterized in that, to initiate the bidirectional data exchange, an identification code of the vehicle, in particular the official registration mark of the vehicle, is input or detected using the mobile communication device and transmitted to the database.

4. The method according to claim 3, characterized in that, after transmission of the identification code of the vehicle to the database, it establishes the bidirectional data connection to the router or transmits access data, in particular comprising a serial number, of the router to the mobile communication device, using which subsequently a bidirectional data connection is established between the mobile communication device and the router.

5. The method according to claim 1, characterized in that, even when the onboard electrical system is turned off, the tire air pressure and/or the at least one other tire-specific variable is detected at regular or irregular predefined intervals using the detection unit of the tire sensor, transmitted by means of the transmitter to the router, and stored in the memory of the router.

6. The method according to claim 1, characterized in that, after the bidirectional data connection is established between the router and the database or during or after the coupling of the mobile communication device to the interface of the router, the tire air pressure and/or the at least one other tire-specific variable is detected using the detection unit of the tire sensor, transmitted by means of the transmitter to the router, and stored in the memory of the router.

7. The method according to claim 1, characterized in that the data and/or logs of a visual check of the vehicle and/or the tires are input into the mobile communication device or detected thereby and transmitted to the database.

8. A tire monitoring system for monitoring a tire air pressure and/or at least one other tire-specific variable in tires of a vehicle, in particular of a trailer or semitrailer of a truck;

having a plurality of tire sensors for positioning in the tires of the vehicle; wherein each tire sensor comprises at least one detection unit for detecting a tire-specific variable and a control device having at least one transmitter for transmitting signals as a function of the detected variable;

having a router for installation in the vehicle, which comprises a receiver for receiving the signals of the plurality of tire sensors, a memory for storing variables of the tire sensors transmitted with the signals, and an interface for the wired or wireless query of the stored variables; wherein the router has an electrical power terminal, via which the router is connectable to an onboard electrical system for its power supply; and the router has an energy storage, which provides an electrical power supply when the onboard electrical system is turned off and which is chargeable via the electrical power terminal;

having a mobile communication device, which can be coupled to the interface of the router;

characterized in that the mobile communication device has an Internet access, via which it can be coupled to a database having router-specific data and is configured to execute a method according to claim 1.

9. The tire monitoring system according to claim 8, characterized in that the database is a web-browser-assisted database.

10. The method according to claim 2, characterized in that, to initiate the bidirectional data exchange, an identification code of the vehicle, in particular the official registration mark of the vehicle, is input or detected using the mobile communication device and transmitted to the database.

11. The method according to claim 2, characterized in that, even when the onboard electrical system is turned off, the tire air pressure and/or the at least one other tire-specific variable is detected at regular or irregular predefined intervals using the detection unit of the tire sensor, transmitted by means of the transmitter to the router, and stored in the memory of the router.

12. The method according to claim 3, characterized in that, even when the onboard electrical system is turned off, the tire air pressure and/or the at least one other tire-specific variable is detected at regular or irregular predefined intervals using the detection unit of the tire sensor, transmitted by means of the transmitter to the router, and stored in the memory of the router.

13. The method according to claim 4, characterized in that, even when the onboard electrical system is turned off, the tire air pressure and/or the at least one other tire-specific variable is detected at regular or irregular predefined intervals using the detection unit of the tire sensor, transmitted by means of the transmitter to the router, and stored in the memory of the router.

14. The method according to claim 2, characterized in that, after the bidirectional data connection is established between the router and the database or during or after the coupling of the mobile communication device to the interface of the router, the tire air pressure and/or the at least one other tire-specific variable is detected using the detection unit of the tire sensor, transmitted by means of the transmitter to the router, and stored in the memory-of the router.

15. The method according to claim 3, characterized in that, after the bidirectional data connection is established between the router and the database or during or after the coupling of the mobile communication device to the interface of the router, the tire air pressure and/or the at least one other tire-specific variable is detected using the detection unit of the tire sensor, transmitted by means of the transmitter to the router, and stored in the memory-of the router.

16. The method according to claim 4, characterized in that, after the bidirectional data connection is established between the router and the database or during or after the coupling of the mobile communication device to the interface of the router, the tire air pressure and/or the at least one other tire-specific variable is detected using the detection unit of the tire sensor, transmitted by means of the transmitter to the router, and stored in the memory-of the router.

17. The method according to claim 5, characterized in that, after the bidirectional data connection is established between the router and the database or during or after the coupling of the mobile communication device to the interface of the router, the tire air pressure and/or the at least one other tire-specific variable is detected using the detection unit of the tire sensor, transmitted by means of the transmitter to the router, and stored in the memory-of the router.

18. The method according to claim 2, characterized in that the data and/or logs of a visual check of the vehicle and/or the tires are input into the mobile communication device or detected thereby and transmitted to the database.

19. The method according to claim 3, characterized in that the data and/or logs of a visual check of the vehicle and/or the tires are input into the mobile communication device or detected thereby and transmitted to the database.

20. The method according to claim 4, characterized in that the data and/or logs of a visual check of the vehicle and/or the tires are input into the mobile communication device or detected thereby and transmitted to the database.

21. The method according to claim 5, characterized in that the data and/or logs of a visual check of the vehicle and/or the tires are input into the mobile communication device or detected thereby and transmitted to the database.

* * * * *